(12) United States Patent
Heo

(10) Patent No.: US 8,835,042 B2
(45) Date of Patent: Sep. 16, 2014

(54) BATTERY PACK

(75) Inventor: Sangdo Heo, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 536 days.

(21) Appl. No.: 13/163,455

(22) Filed: Jun. 17, 2011

(65) Prior Publication Data
US 2012/0202093 A1    Aug. 9, 2012

(30) Foreign Application Priority Data

Feb. 9, 2011 (KR) .................. 10-2011-0011419

(51) Int. Cl.
*H01M 2/02* (2006.01)
*H01M 2/04* (2006.01)
*H01M 10/42* (2006.01)

(52) U.S. Cl.
CPC .......... *H01M 10/425* (2013.01); *H01M 2/0217* (2013.01); *Y02E 60/12* (2013.01); *H01M 2/0207* (2013.01)
USPC .......................................... 429/163; 429/175

(58) Field of Classification Search
CPC ...... H01M 2/00; H01M 2/021; H01M 2/0207
USPC ................. 429/7, 92, 163, 175–180
See application file for complete search history.

(56) References Cited

U.S. PATENT DOCUMENTS

| | | | |
|---|---|---|---|
| 2005/0164080 A1* | 7/2005 | Kozu et al. | 429/176 |
| 2006/0121343 A1* | 6/2006 | Shu | 429/163 |
| 2007/0065718 A1 | 3/2007 | Moon | |
| 2008/0261109 A1* | 10/2008 | Shieh | 429/176 |
| 2010/0075216 A1 | 3/2010 | Yoo | |

FOREIGN PATENT DOCUMENTS

| | | |
|---|---|---|
| JP | 09-045297 A | 2/1997 |
| JP | 2003-045381 A | 2/2003 |
| JP | 2008-112660 | 5/2008 |
| KR | 10-2006-0054233 A | 5/2006 |
| KR | 10-2006-0102823 A | 9/2006 |
| KR | 10-2010-0033041 | 3/2010 |
| WO | WO 2007/117084 A1 | 10/2007 |

OTHER PUBLICATIONS

Patent Abstracts of Japan, and English machine translation of Japanese Publication 2008-112660, (9 pages).
Machine English Translation of JP 09-045297 A.
Machine English Translation of JP 2003-045381 A.

* cited by examiner

*Primary Examiner* — Jonathan G Leong
*Assistant Examiner* — James Erwin
(74) *Attorney, Agent, or Firm* — Christie, Parker & Hale, LLP

(57) ABSTRACT

A battery pack includes: a core pack including a bare cell and a protection circuit module electrically coupled to the bare cell; a lower case receiving the core pack and having a receiving groove on a top surface of a sidewall of the lower case; and a cover plate including a base cover covering a front surface of the bare cell and side covers, a corresponding one of the side covers being inserted into the receiving groove, wherein each of the side covers is bent at least once.

12 Claims, 11 Drawing Sheets

BATTERY PACK

CROSS-REFERENCE TO RELATED APPLICATION

This application claims priority to and the benefit of Korean Patent Application No. 10-2011-0011419, filed on Feb. 9, 2011, the entire content of which is incorporated herein by reference.

BACKGROUND

1. Field

Embodiments of the present invention relate to a battery pack.

2. Description of Related Art

To protect a battery cell by increasing the sheath strength of a battery pack, a method of using a reinforcement plate has been proposed. According to the proposed method, a reinforcement plate formed on one plane of a sheath case of a battery pack is insert-molded. A side surface of the reinforcement plate formed on another plane of the sheath case is processed to have a serrated form, and forcibly inserted into an insert-molded product by ultrasonic vibration, thereby coupling upper and lower sheath cases of the battery pack to each other.

In the proposed method, however, components may be damaged depending on (or according to) the location of the protection circuit module and depending on component type, during ultrasonic vibration performed for coupling the reinforcement plate to the insert-molded product. In addition, since the side surface of the reinforcement plate is serrated, the serrated form is vulnerable to damage from external impact, making it difficult to effectively protect a battery cell when external impact is applied to the battery cells.

SUMMARY

Embodiments of the present invention provide a battery pack, which maintains strength against external impact while securing the capacity of a battery, without increasing the thickness of a reinforcement plate.

According to an embodiment of the present invention, a battery pack includes: a core pack including a bare cell and a protection circuit module electrically coupled to the bare cell; a lower case receiving the core pack and having a receiving groove on a top surface of a sidewall of the lower case; and a cover plate including a base cover covering a front surface of the bare cell and side covers, a corresponding one of the side covers being inserted into the receiving groove, wherein each of the side covers is bent at least once.

The side covers of the cover plate may be connected to one another.

The side covers may be bent inward with respect to the cover plate.

The lower case may include: a reinforcement plate including a base plate and side plates perpendicularly extending from edges of the base plate; and a resin portion formed to cover the reinforcement plate.

The side plates of the reinforcement plate may be connected to one another.

At least one resin hole may be through each of the side plates in a thickness direction.

The side plates may be bent at least once.

The resin portion may be formed to envelop the side plates.

The resin portion may have an outer wall outside the lower case and an inner wall inside the lower case, and the receiving groove may be on a top surface of the inner wall.

The inner wall may be lower than the outer wall.

A thickness of the base cover may be substantially equal to a height difference between the inner wall and the outer wall.

As described above, a battery pack according to an embodiment of the present invention can reduce a risk of creating defects in components, by removing an ultrasonic welding process.

In addition, a battery pack according to an embodiment of the present invention can increase the capacity thereof by reducing a thickness of a sheath case.

Further, a battery pack according to an embodiment of the present invention can increase a coupling force between the upper and lower cases.

Additional aspects and/or features of the invention will be set forth in part in the description which follows and, in part, will be obvious from the description, or may be learned by practice of the invention.

BRIEF DESCRIPTION OF THE DRAWINGS

Aspects and features of embodiments according to the present invention will be more apparent from the following detailed description in conjunction with the accompanying drawings, in which.

DETAILED DESCRIPTION

Reference will now be made in detail to exemplary embodiments of the present invention, examples of which are illustrated in the accompanying drawings.

Figure 1:
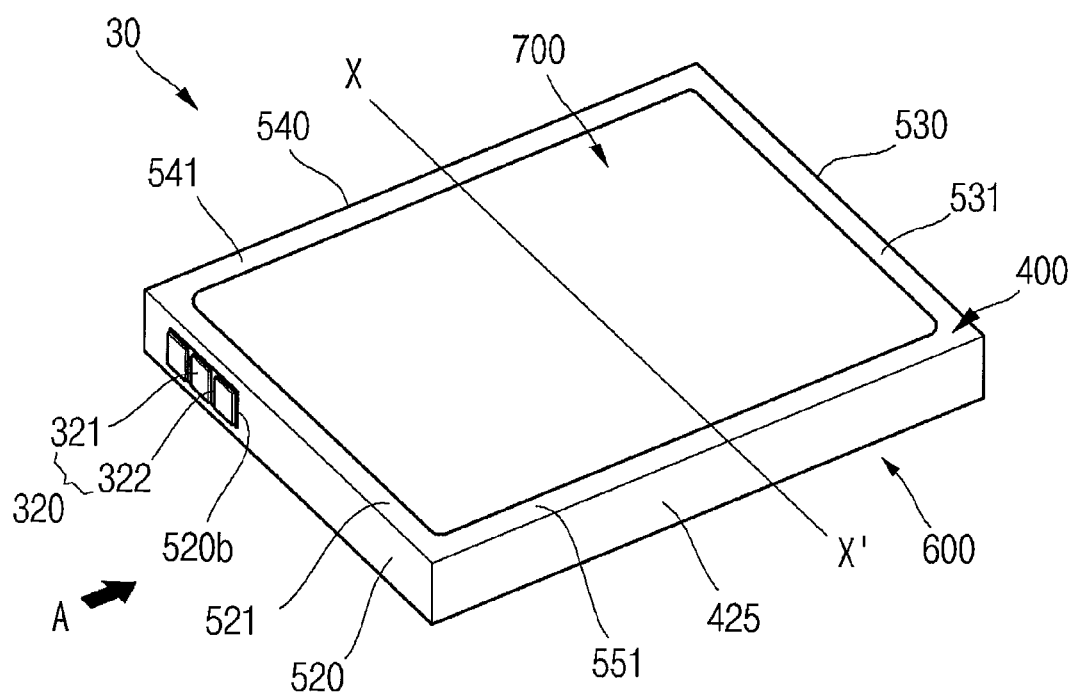
FIG. 1 is a perspective view illustrating a battery pack according to an embodiment of the present invention.
Figure 2:
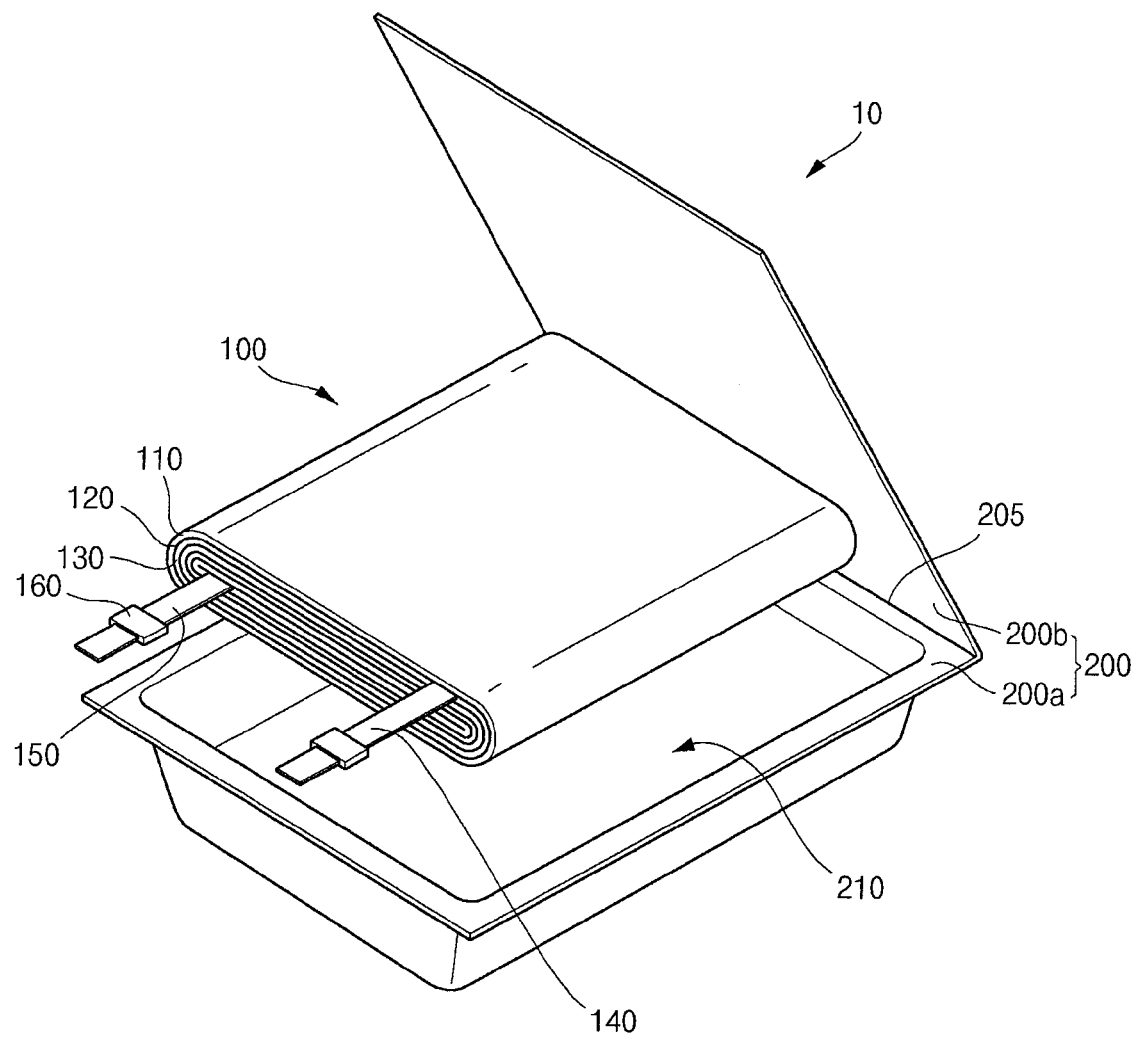
FIG. 2 is an exploded perspective view of a bare cell of the battery pack shown in FIG. 1.
Figure 3:
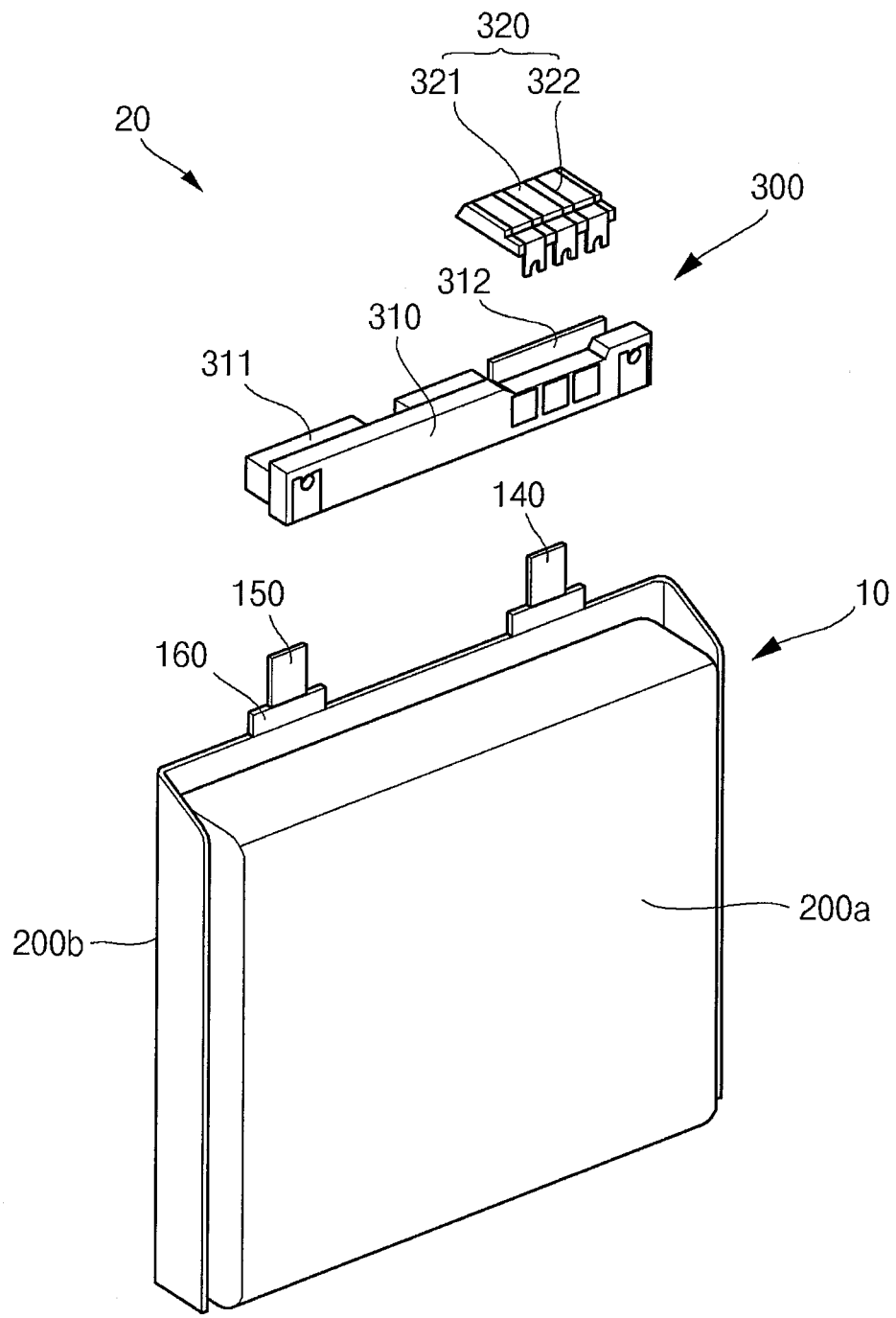
FIG. 3 is an exploded perspective view of a core pack of the battery pack shown in FIG. 1.

FIG. 1 is a perspective view illustrating a battery pack in its final assembled form according to an embodiment of the present invention, FIG. 2 is an exploded perspective view of a bare cell of the battery pack shown in FIG. 1, and FIG. 3 is an exploded perspective view of a core pack of the battery pack shown in FIG. 1.

Referring to FIGS. 1 to 3, the battery pack 30 according to an embodiment of the present invention includes an electrode assembly 100, an insulation case 200, a printed circuit module (PCM) 300, a lower case 600 and a cover plate 700.

Referring to FIG. 2, the electrode assembly 100 includes a positive electrode plate 110 having opposite surfaces coated with a positive electrode active material, a negative electrode 130 coated with a negative electrode active material and a separator 120 interposed between the positive electrode plate 110 and the negative electrode plate 130.

A positive electrode tab 140 protruding (e.g., protruding by a predetermined length) from an uncoated portion (not shown) of the positive electrode plate 110 and functioning as a positive electrode, is welded to the positive electrode plate 110. In addition, a negative electrode tab 150 protruding (e.g., protruding by a predetermined length) from an uncoated portion (not shown) of the negative electrode plate 130 and functioning as a negative electrode, is welded to the negative electrode plate 130. Further, the positive electrode tab 140 and the negative electrode tab 150 may have an insulation tape 160 for preventing an electrical short-circuit between the positive electrode tab 140 and the negative electrode tab 150. The positive electrode tab 140 and the negative electrode tab 150 protrude outwardly from (or are drawn outside of) the insulation case 200 through one surface of the insulation case 200. In addition, the positive electrode tab 140 and the negative electrode tab 150 are electrically connected to the PCM 300.

Referring to FIG. 2, the insulation case 200 includes a front case 200a and a rear case 200b defined about a fold line 205 formed at the center of an insulation layer forming the insulation case 200.

A receiving portion 210 is formed in the front case 200a (e.g., formed by a pressing process) to receive the electrode assembly 100. The electrode assembly 100 is placed in the receiving portion 210 and the front case 200a is covered by the rear case 200b, and then thermal fusion is performed along edges of the receiving portion 210 to seal the case 200, thereby completing the bare cell 10.

Throughout the specification describing embodiments of the present invention, an upper portion of the bare cell 10 is defined as extending along a direction from which the positive electrode tab 140 and the negative electrode tab 150 protrude (or are drawn out), a front portion of the bare cell 10 is defined as extending along a direction in which the front case 200a is formed, and a rear portion of the bare cell 10 is defined as extending along a direction in which the rear case 200b is formed.

Referring to FIG. 3, the PCM 300 includes a PCB 310 and an external terminal portion 320. The PCM 300 is coupled to the upper portion of the bare cell 10.

The PCB 310 may be a printed circuit board having a protection circuit element (not shown) for controlling charging and discharging of a battery and having a conductive wire pattern (not shown) formed thereon. The conductive wire pattern may be formed on an outer surface or inside of the PCB 310. The PCB 310 is electrically connected to electrode tabs 140 and 150 through connecting terminals 311 and 312.

The external terminal portion 320 includes a metal section 321 and a housing section 322 surrounding the metal section 321. The metal section 321 is made of a conductive material to allow current to flow between the PCM 300 and an external device (not shown). The housing section 322 is made of an insulating material, for example, plastic, to allow the metal sections 321 spaced apart from each other at regular intervals to be insulated from each other. In addition, an insulation sheet (not shown) may further be formed between the PCM 300 and the top surface of the bare cell 10 to prevent an unnecessary short-circuit therebetween.

The bare cell 10 and the PCM 300 are assembled with each other, and the assembled bare cell 10 and PCM 300 may be referred to as a core pack 20.

Figure 4A:
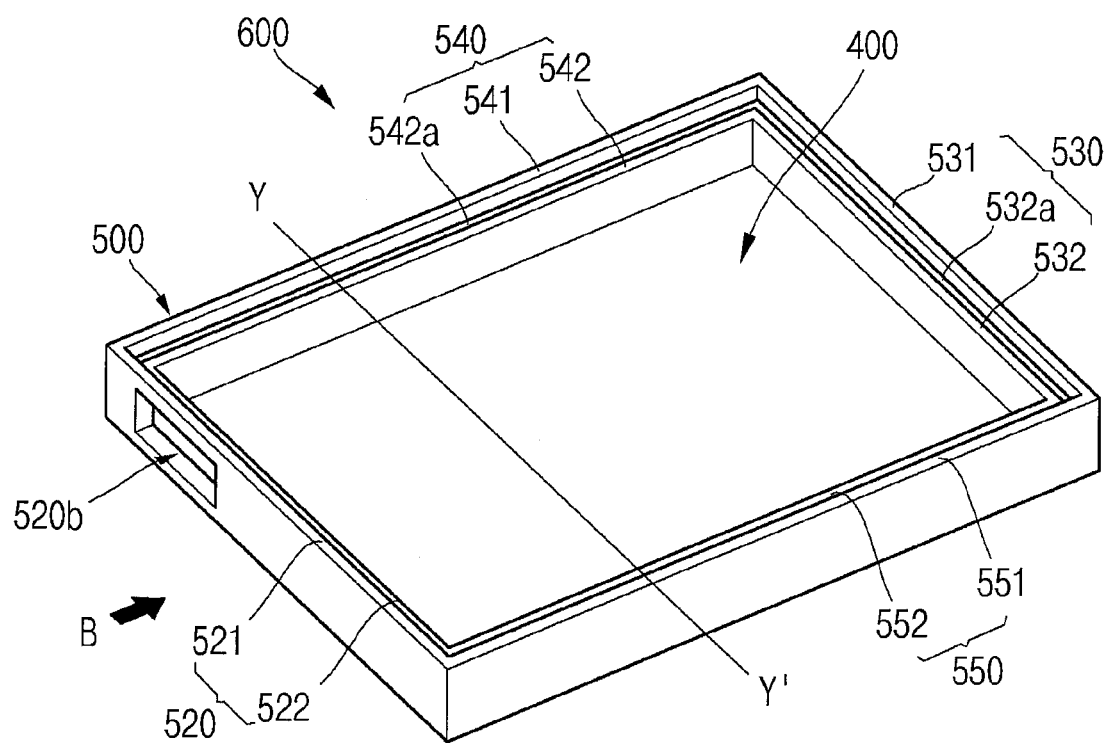
FIGS. 4A and 4B are a perspective view and a plan view, respectively, of a lower case of the battery pack shown in FIG. 1.
Figure 4B:
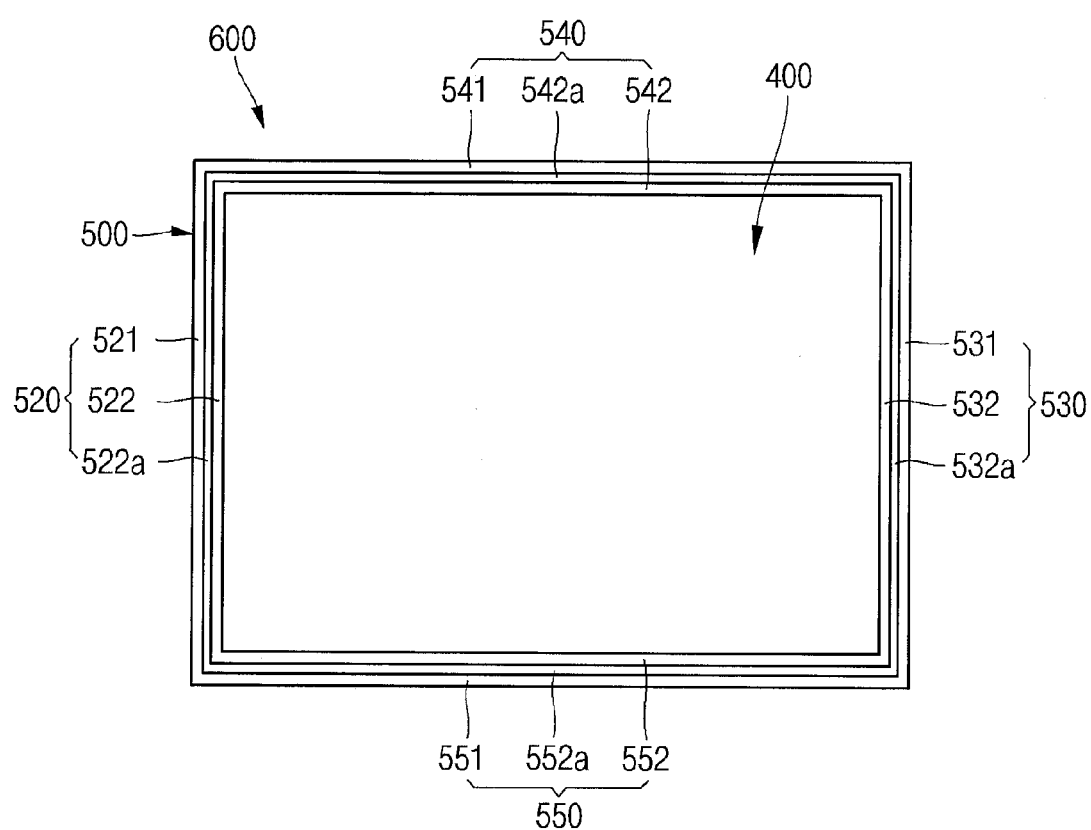

Hereinafter, a lower case of the battery pack according to an embodiment of the present invention will be described with reference to FIGS. 4A to 6. FIGS. 4A and 4B are a perspective view and a plan view, respectively, of a lower case of the battery pack shown in FIG. 1, FIG. 5 is a perspective view of a reinforcement plate case of the battery pack shown in FIG. 1, and FIG. 6 is a cross-sectional view in a 'B' direction, taken along the line Y-Y' of FIG. 4A.

Referring to FIGS. 4A to 6, the lower case 600 includes a reinforcement plate 400 and a resin portion 500. The lower case 600 may have a substantially hexahedral shape, one plane of which is opened, and is formed by insert molding the reinforcement plate 400. The insert molding refers to a method in which a reinforcement member such as a metal plate or a film is put into a mold frame and a resin is poured into the mold frame, followed by molding of the resin to form an inject-molded product. In a case where an insert-molded product with a reinforcement member is used as a sheath member of a battery pack, the core pack in the battery pack can be effectively protected against external impact while maintaining the battery capacity without increasing the thickness of the sheath member. In addition, the case formed by insert molding the reinforcement member may have enhanced strength with respect to reducing or avoiding the effects of twisting or warpage, compared to a conventional case having a reinforcement member attached to an outer surface of a resin case.

Figure 5:
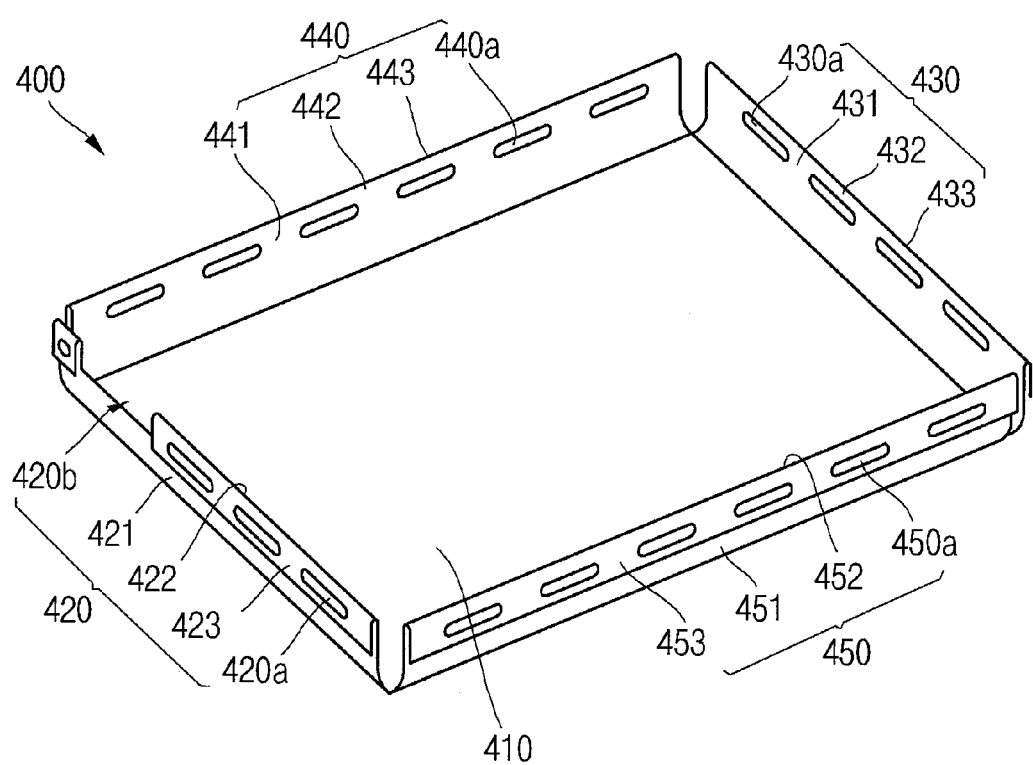
FIG. 5 is a perspective view of a reinforcement plate case of the battery pack shown in FIG. 1.
Figure 6:
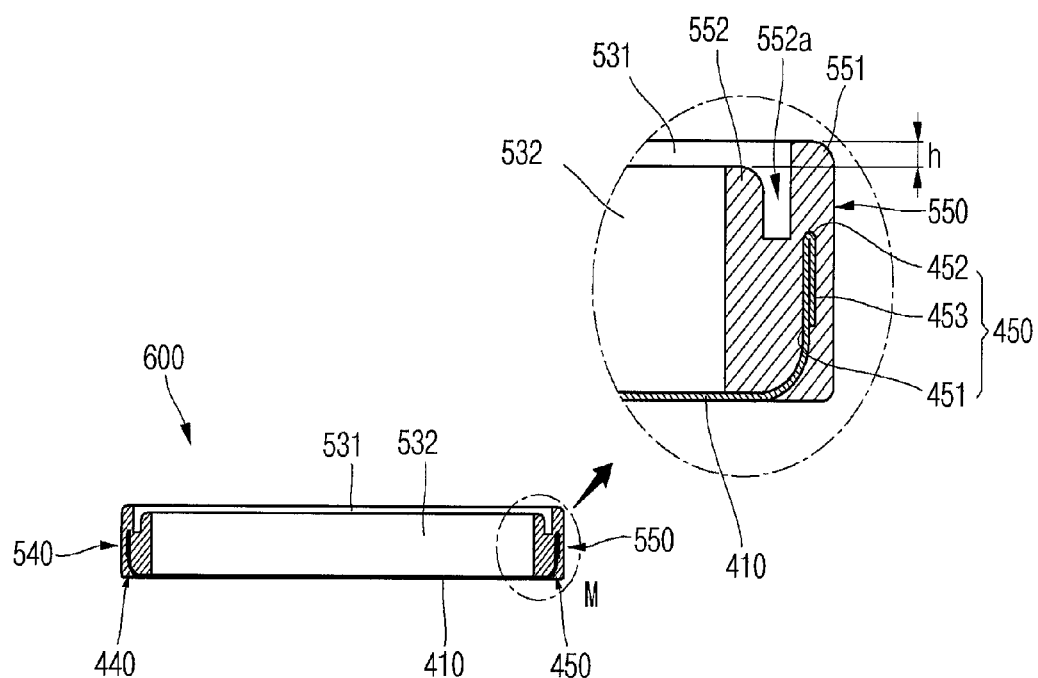
FIG. 6 is a cross-sectional view in a 'B' direction, taken along the line Y-Y' of FIG. 4A.

Referring to FIG. 5, the reinforcement plate 400 includes a base plate 410, a first side plate 420, a second side plate 430, a third side plate 440 and a fourth side plate 450. The reinforcement plate 400 is provided for reinforcing the strength of the lower case 600, and in one embodiment, is made of a metal material, such as stainless steel.

The base plate 410 forms a bottom surface of the reinforcement plate 400, and contacts a rear surface of the bare cell 10.

The first side plate 420 includes a first extending portion 421, a first bent portion 422 and a first reinforcement portion 423. In addition, the first side plate 420 has a terminal groove 420b formed to correspond to a location of an external terminal portion 320 of the core pack 20. The first side plate 420 may further include at least one first resin hole 420a through the first extending portion 421 and the first reinforcement portion 423 in a thickness direction. The first extending portion 421 extends in a perpendicular direction to one short side surface of the base plate 410. A first bent portion 422 is formed at a height (e.g., a predetermined height) of the first extending portion 421 along a length direction of the first side plate 420. The first extending portion 421 is bent at the first bent portion 422, forming the first reinforcement portion 423. The first reinforcement portion 423 is formed to face the first extending portion 421. Therefore, the first side plate 420 is formed to have a thickness at least twice that of the base plate 410. Accordingly, the strength of the first side plate 420 can be enhanced. In addition, a coupling force between the reinforcement plate 400 and the resin portion 500 can be improved during the insert molding. Further, the number of times the first side plate 420 is bent may be increased, thereby further improving the strength of the first side plate 420 and further improving the coupling force between the reinforcement plate 400 and the resin portion 500. The first resin hole 420a provides a space for resin to permeate through during insert molding, thereby fixing the reinforcement plate 400 to the resin more tightly. While FIG. 5 illustrates that the first reinforcement portion 423 is bent toward the outside of the reinforcement plate 400 at the bent portion 422, the invention is not limited thereto and the first reinforcement portion 423 may also be bent toward the inside of the reinforcement plate 400.

The second side plate 430 includes a second extending portion 431, a second bent portion 432 and a second reinforcement portion 433. In addition, the second side plate 430 may further include at least one second resin hole 430a through the second extending portion 431 and the second reinforcement portion 433 in a thickness direction. The second side plate 430 extends in a perpendicular direction to the other short side surface of the base plate 410. Therefore, the second reinforcement portion 433 is formed to face the second extending portion 431. Since configurations and functions of the second extending portion 431, the second bent portion 432, the second reinforcement portion 433 and the second resin hole 430a are substantially the same as those of the first extending portion 421, the first bent portion 422, the first reinforcement portion 423 and the first resin hole 420a, which are formed in the first side plate 420, repeated descriptions thereof will not be given.

The third side plate 440 includes a third extending portion 441, a third bent portion 442 and a third reinforcement portion 443. In addition, the third side plate 440 may further include at least one third resin hole 440a through the third extending portion 441 and the third reinforcement portion 443 in a thickness direction. The third side plate 440 extends in a perpendicular direction to one long side surface of the base plate 410. Since configurations and functions of the third extending portion 441, the third bent portion 442, the third reinforcement portion 443 and the third resin hole 440a are substantially the same as those of the first extending portion 421, the first bent portion 422, the first reinforcement portion 423 and the first resin hole 420a, which are formed in the first side plate 420, repeated descriptions thereof will not be given.

The fourth side plate 450 includes a fourth extending portion 451, a fourth bent portion 452 and a fourth reinforcement portion 453. In addition, the fourth side plate 450 may further include at least one fourth resin hole 450a through the fourth extending portion 451 and the fourth reinforcement portion 453 in a thickness direction. The fourth side plate 450 extends in a perpendicular direction to the other long side surface of the base plate 410. Therefore, the fourth side plate 450 is formed to face the third side plate 440. Since configurations and functions of the fourth extending portion 451, the fourth bent portion 452, the fourth reinforcement portion 453 and the fourth resin hole 450a are substantially the same as those of the first extending portion 421, the first bent portion 422, the first reinforcement portion 423 and the first resin hole 420a, which are formed in the first side plate 420, repeated descriptions thereof will not be given.

Referring to FIGS. 4A, 4B and 6, the resin portion 500 includes a first resin portion 520, a second resin portion 530, a third resin portion 540, and a fourth resin portion 550. The resin portion 500 is formed by insert molding the reinforcement plate 400. Therefore, the resin portion 500 is formed to envelop the reinforcement plate 400. In addition, in the described embodiment, the resin portion 500 is formed only on the side plates 420, 430, 440 and 450 of the reinforcement plate 400. This is because the capacity relative to the volume is reduced as the thickness of the battery pack 30 increases when the resin portion 500 is formed on the base plate 410.

The first resin portion 520 is formed to envelop the first side plate 420. In addition, the first resin portion 520 includes a first outer wall 521 formed outside the lower case 600, and a first inner wall 522 formed inside the lower case 600. In addition, a first receiving groove 522a having a depth (e.g., a predetermined depth) in the depth direction of the first inner wall 522 is formed on a top surface of the first inner wall 522. The first inner wall 522 in the described embodiment is formed to be lower than the first outer wall 521. In addition, a height difference h between the first outer wall 521 and the first inner wall 522 in the described embodiment is equal to a thickness of the cover plate 700, which will later be described. If the height difference h between the first inner wall 521 and a first inner wall 522 is not equal to the thickness of the cover plate 700, a step difference is created between the outer surface of the cover plate 700 and the top surface of the first outer wall 521. Therefore, an insulation (not shown) layer that surrounds the outer surface of the battery pack 30 may be damaged. The first resin portion 520 includes a terminal hole 520b located and sized to fit the external terminal portion 320 and the terminal groove 420b. The terminal hole 520b exposes the external terminal portion 320 of the core pack 20 housed in the lower case 600 to the outside.

The second resin portion 530 is formed to envelop the second side plate 430. Therefore, the second resin portion 530 is formed to face the first resin portion 520. In addition, the second resin portion 530 includes a second outer wall 531 formed outside the lower case 600, and a second inner wall 532 formed inside the lower case 600. In addition, a second receiving groove 532a having a depth (e.g., a predetermined depth) in the depth direction of the second inner wall 532 is formed on a top surface of the second inner wall 532. The second inner wall 532 in the described embodiment is formed to be lower than the second outer wall 531. In addition, a height difference h between the second outer wall 531 and the second inner wall 532 in the described embodiment is equal to a thickness of the cover plate 700, which will later be described.

The third resin portion 540 is formed to envelop the third side plate 440. In addition, the third resin portion 540 includes a third outer wall 541 formed outside the lower case 600, and a third inner wall 542 formed inside the lower case 600. In addition, a third receiving groove 542a having a depth (e.g., a predetermined depth) in the depth direction of the third inner wall 542 is formed on a top surface of the third inner wall 542. The third inner wall 542 in the described embodiment is formed to be lower than the third outer wall 541. In addition, a height difference h between the third outer wall 541 and the third inner wall 542 in the described embodiment is equal to a thickness of the cover plate 700, which will later be described.

The fourth resin portion 550 is formed to envelop the fourth side plate 450. Therefore, the fourth resin portion 550 is formed to face the third resin portion 540. In addition, the fourth resin portion 550 includes a fourth outer wall 551 formed outside the lower case 600, and a fourth inner wall 552 formed inside the lower case 600. In addition, a fourth receiving groove 552a having a depth (e.g., a predetermined depth) in the depth direction of the fourth inner wall 552 is formed on a top surface of the fourth inner wall 552. The fourth inner wall 552 in the described embodiment is formed to be lower than the fourth outer wall 551. In addition, a height difference h between the fourth outer wall 551 and the fourth inner wall 552 in the described embodiment is equal to a thickness of the cover plate 700, which will later be described.

Figure 7:
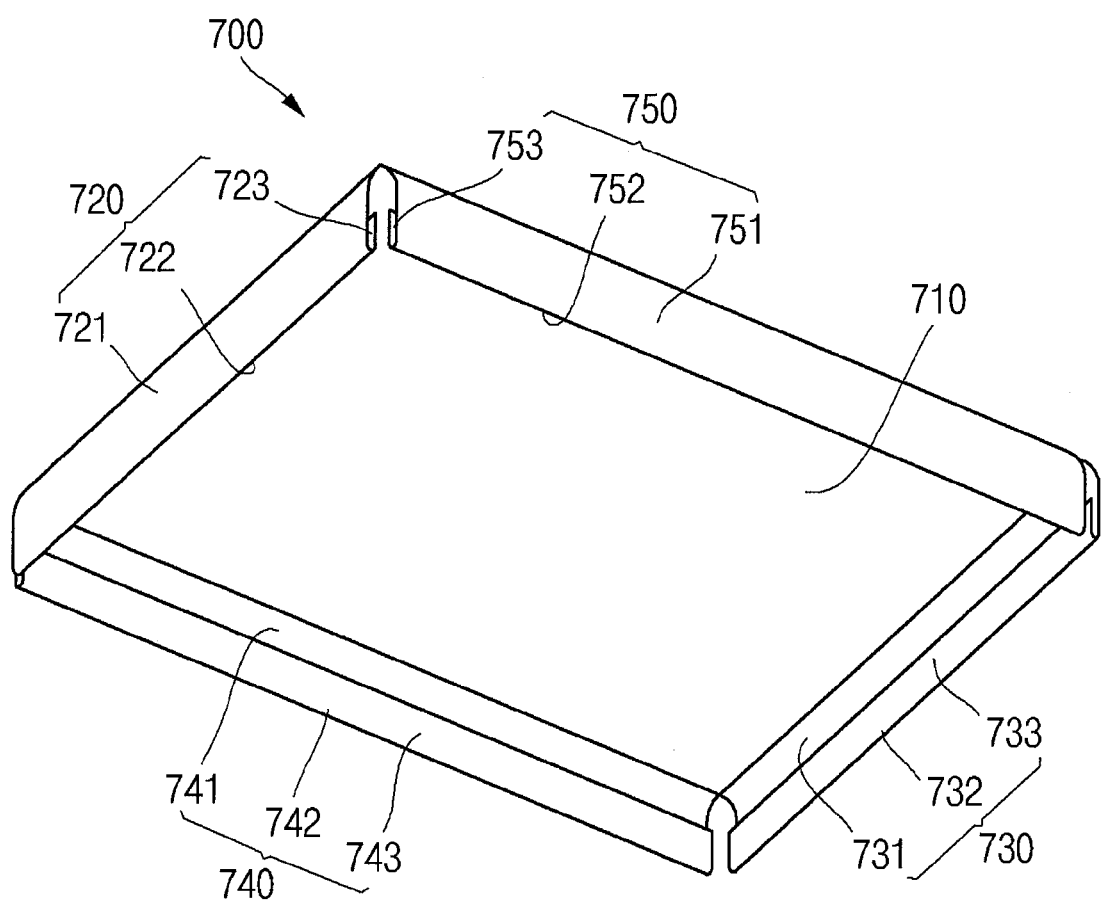
FIG. 7 is a perspective view of a cover case of the battery pack shown in FIG. 1.

Hereinafter, a cover plate of the battery pack according to an embodiment will be described with reference to FIGS. 7 and 8. FIG. 7 is a perspective view of a cover case of the battery pack shown in FIG. 1, and FIG. 8 is a partial cross-sectional view in an 'A' direction, taken along the line X-X' of FIG. 1.

Referring to FIG. 7, the cover plate 700 includes a base cover 710, a first side cover 720, a second side cover 730, a third side cover 740 and a fourth side cover 750.

Figure 8:
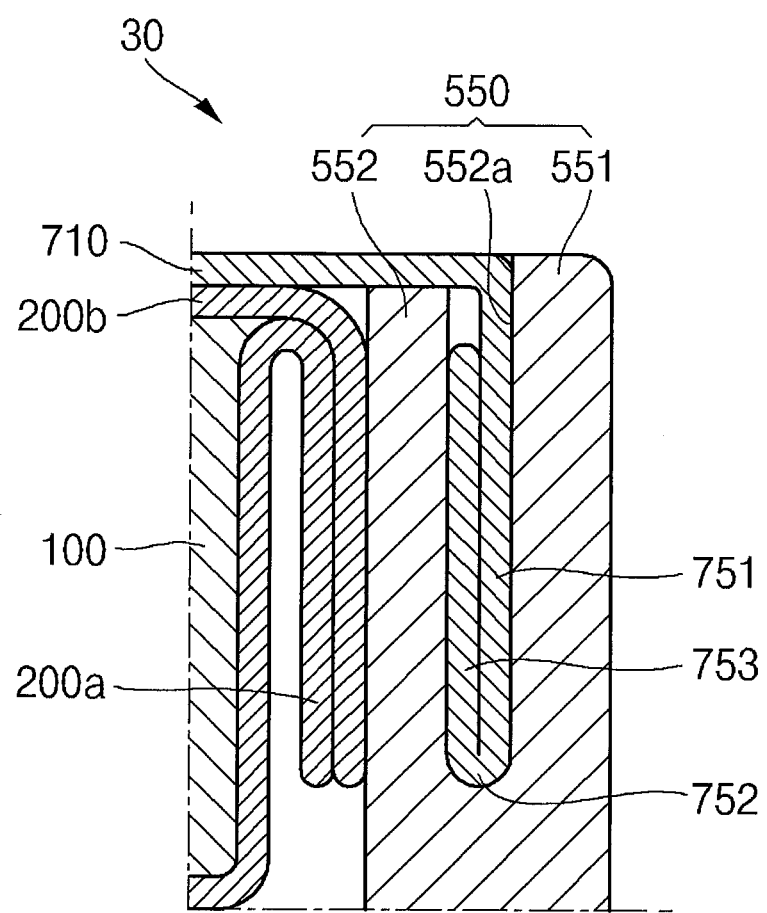
FIG. 8 is a partial cross-sectional view in an 'A' direction, taken along the line X-X' of FIG. 1.

Referring to FIG. 8, the cover plate 700 is coupled to the lower case 600 while covering a front surface of the bare cell 10. That is to say, the cover plate 700 is combined with the lower case 600 such that side covers 720, 730, 740 and 750 are inserted into receiving grooves 522a, 532a, 542a and 552a of the lower case 600. The cover plate 700 is shaped to fit the lower case 600. In addition, the cover plate 700 may be made of stainless steel, like the reinforcement plate 400 of the lower case 600.

The base cover 710 forms a bottom surface of the cover plate 700 and is closely adhered to the front surface of the bare cell 10. In addition, the base cover 710 in the described embodiment is formed to have a thickness equal to a height difference h between each of inner walls 522, 532, 542 and 552 and each of outer walls 521, 531, 541 and 551 of the lower case 600. This is for the purpose of making the outer surface of the base cover 710 coplanar with top surfaces of outer walls 521, 531, 541 and 551 of the resin portion 500 when the cover plate 700 is combined with the lower case 600. In such a manner, an insulation layer (e.g., insulation tape) (not shown) that surrounds the outer surface of the battery pack can be prevented from being damaged.

The first side cover 720 is inserted into the first receiving groove 522a formed in the first resin portion 520 in an interference fit manner. In addition, the first side cover 720 includes a fifth extending portion 721, a fifth bent portion 722 and a fifth reinforcement portion 723. The fifth extending portion 721 extends in a perpendicular direction to one short side surface of the base plate 710. A fifth bent portion 722 is formed at a height (e.g., a predetermined height) of the fifth extending portion 721 along a length direction of the fifth side plate 720. The fifth extending portion 721 is bent at the fifth bent portion 722, forming the fifth reinforcement portion 723. The fifth reinforcement portion 723 is formed to face the fifth extending portion 721. Therefore, the fifth side plate 720 is formed to have a thickness at least twice that of the base plate 710. Accordingly, the strength of the fifth side plate 720 can be enhanced. In addition, a coupling force can be improved when the fifth side plate 720 is inserted into the first receiving groove 522a in an interference fit manner. Further, the number of times the fifth side plate 720 is bent may be increased, thereby further improving the strength of the fifth side plate 720 and further improving the coupling force when the fifth side plate 720 is inserted into the first receiving groove 522a in an interference fit manner. The fifth reinforcement portion 723 in the described embodiment is bent inward with respect to the cover plate 700 at the bent portion 722. This is for the purpose of preventing a gap from being created between the first side cover 720 and a top surface of the first outer wall 521 of the first resin portion 520.

The second side cover 730 is inserted into a second receiving groove 532a formed in the second resin portion 530 in an interference fit manner. In addition, the second side cover 730 includes a sixth extending portion 731, a sixth bent portion 732 and a sixth reinforcement portion 733. The sixth extending portion 731 extends in a perpendicular direction to the other short side surface of the base plate 710. A sixth bent portion 732 is formed at a height (e.g., a predetermined height) of the sixth extending portion 731 along a length direction of the second side cover 730. The sixth extending portion 731 is bent at the sixth bent portion 732, forming the sixth reinforcement portion 733. The sixth reinforcement portion 733 is formed to face the sixth extending portion 731. Since configurations and functions of the sixth extending portion 731, the sixth bent portion 732 and the sixth reinforcement portion 733 are substantially the same as those of the fifth extending portion 721, the fifth bent portion 722 and the fifth reinforcement portion 723, which are formed in the first side plate 720, repeated descriptions thereof will not be given.

The third side cover 740 is inserted into a third receiving groove 542a formed in the third resin portion 540 in an interference fit manner. In addition, the third side cover 740 includes a seventh extending portion 741, a seventh bent portion 742 and a seventh reinforcement portion 743. The seventh extending portion 741 extends in a perpendicular direction to one long side surface of the base plate 710. A seventh bent portion 742 is formed at a height (e.g., a predetermined height) of the seventh extending portion 741 along a length direction of the third side cover 740. The seventh extending portion 741 is bent at the seventh bent portion 742, forming the seventh reinforcement portion 743. The seventh reinforcement portion 743 is formed to face the seventh extending portion 741. Since configurations and functions of the seventh extending portion 741, the seventh bent portion 742 and the seventh reinforcement portion 743 are substantially the same as those of the fifth extending portion 721, the fifth bent portion 722 and the fifth reinforcement portion 723, which are formed in the first side cover 720, repeated descriptions thereof will not be given.

The fourth side cover 750 is inserted into a fourth receiving groove 552a formed in the fourth resin portion 550 in an interference fit manner. In addition, the fourth side cover 750 includes an eighth extending portion 751, an eighth bent portion 752 and an eighth reinforcement portion 753. The eighth extending portion 751 extends in a perpendicular direction to the other long side surface of the base plate 710. An eighth bent portion 752 is formed at a height (e.g., a predetermined height) of the eighth extending portion 751 along a length direction of the fourth side cover 750. The eighth extending portion 751 is bent at the eighth bent portion 752, forming the eighth reinforcement portion 753. The eighth reinforcement portion 753 is formed to face the eighth extending portion 751. Since configurations and functions of the eighth extending portion 751, the eighth bent portion 752 and the eighth reinforcement portion 753 are substantially the same as those of the fifth extending portion 721, the fifth bent portion 722 and the fifth reinforcement portion 723, which are formed in the first side cover 720, repeated descriptions thereof will not be given.

Figure 9:
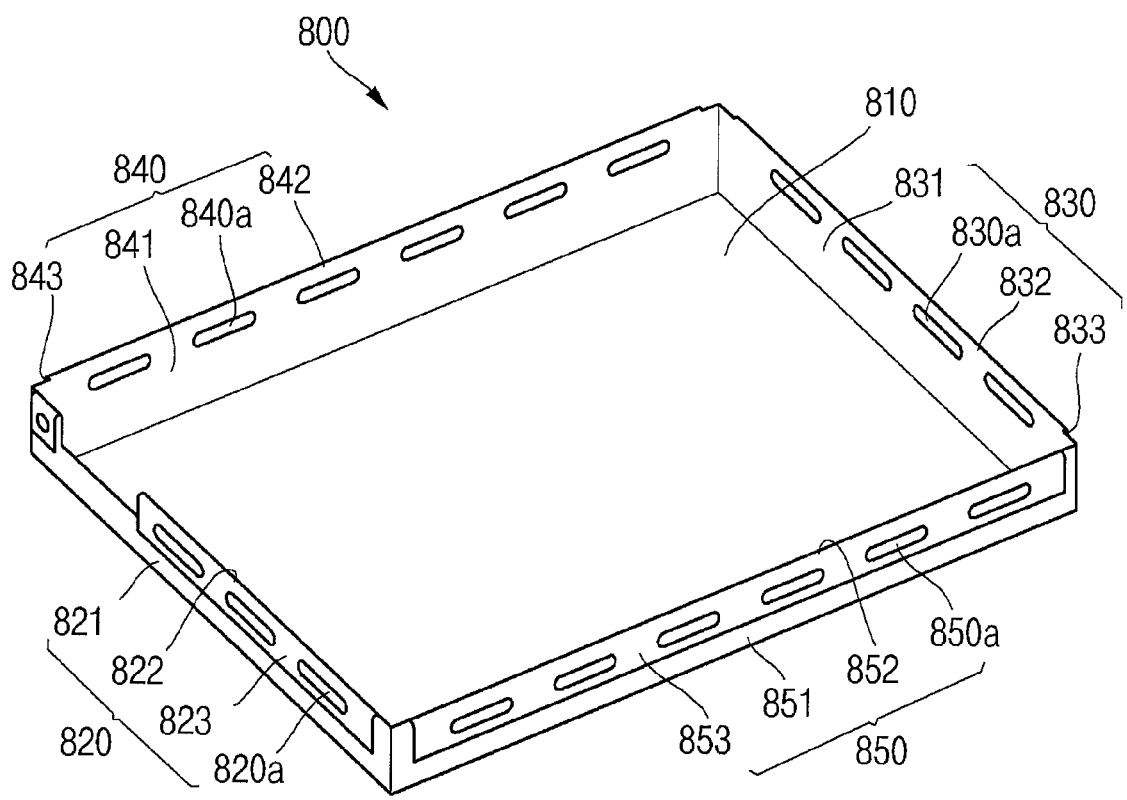
FIG. 9 is a perspective view of a reinforcement plate of a battery pack according to another embodiment of the present invention.

Next, a battery pack according to another embodiment of the present invention will be described with reference to FIGS. 9 and 10. FIG. 9 is a perspective view of a reinforcement plate of a battery pack according to another embodiment of the present invention, and FIG. 10 is a perspective view of a cover plate of the battery pack shown in FIG. 9.

Figure 10:
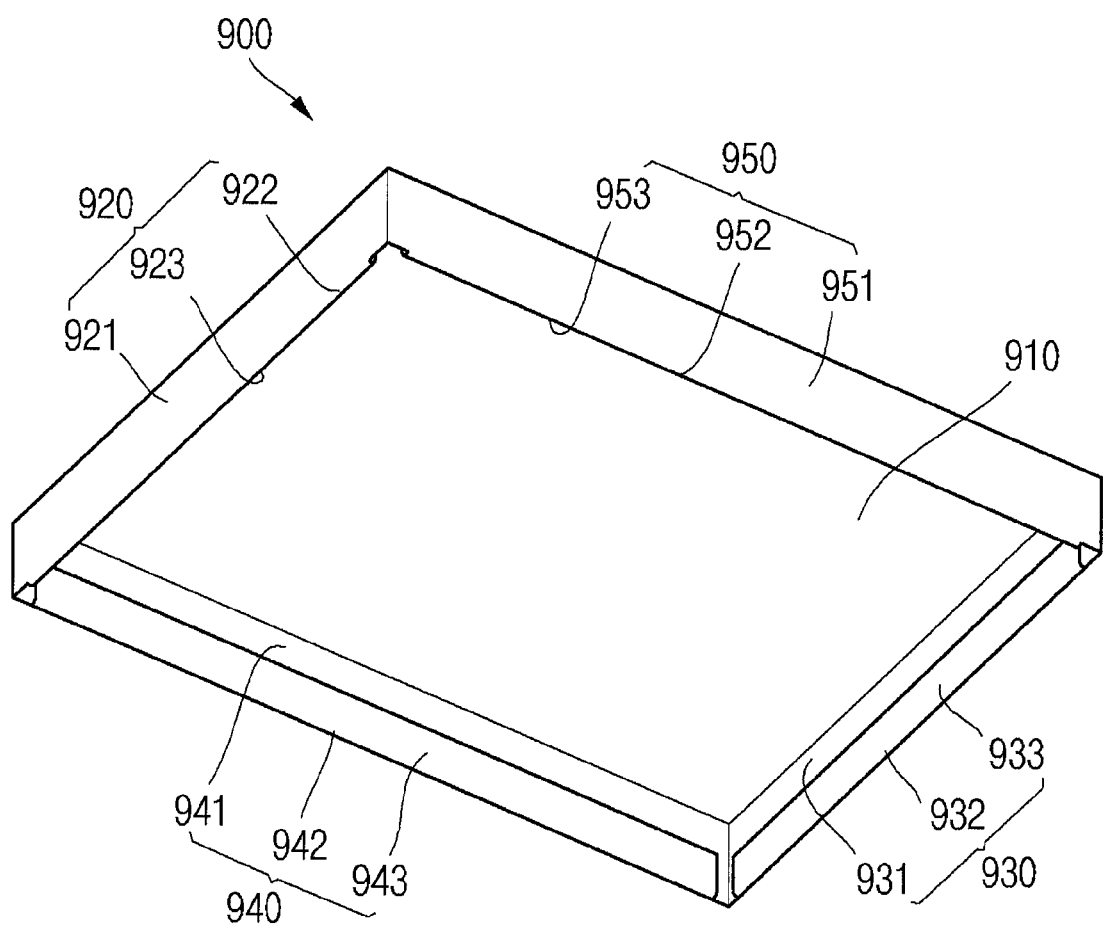
FIG. 10 is a perspective view of a cover plate of the battery pack shown in FIG. 9.

The battery pack according the embodiment of the present invention shown in FIGS. 9 and 10 is different from the battery pack according the previous embodiment, in view of some configurations of a reinforcement plate 800 and a cover plate 900. That is to say, the reinforcement plate 800 is configured by connecting side plates 820, 830, 840 and 850 to one another. In addition, the cover plate 900 is configured by connecting side covers 920, 930, 940 and 950 to one another. Configurations and functions of the other components of the battery pack according to the embodiment of the present invention shown in FIGS. 9 and 10 are substantially the same as those of the battery pack 30 according the previous embodiment. Thus, the following description of the battery pack according the embodiment of the present invention shown in FIGS. 9 and 10 will focus on a connection structure of the side plates 820, 830, 840 and 850 and a connection structure of the side covers 920, 930, 940 and 950, and repeated descriptions of the other components will not be given.

Referring to FIG. 9, the reinforcement plate 800 includes a base plate 810, a first side plate 820, a second side plate 830, a third side plate 840 and a fourth side plate 850. In addition, the side plates 820, 830, 840 and 850 include extending portions 821, 831, 841 and 851, bent portions 822, 832, 842 and 852 and reinforcement portions 823, 833, 843 and 853, respectively. In addition, the side plates 820, 830, 840 and 850 may further include resin holes 820*a*, 830*a*, 840*a* and 850*a* through the extending portions 821, 831, 841 and 851 and the reinforcement portions 823, 833, 843 and 853 in a thickness direction, respectively.

Since the reinforcement plate 800 is configured such that the side plates 820, 830, 840 and 850 are connected to one another, it may have enhanced strength compared to a case where side plates are disconnected from each other.

Referring to FIG. 10, the cover plate 900 includes a base cover 910, a first side cover 920, a second side cover 930, a third side cover 940 and a fourth side cover 950. In addition, the side covers 920, 930, 940 and 950 include extending portions 921, 931, 941 and 951, bent portions 922, 932, 942 and 952 and reinforcement portions 923, 933, 943 and 953, respectively.

Since the cover plate 900 is configured such that the side covers 920, 930, 940 and 950 are connected to one another, it may have enhanced strength compared to a case where side covers are disconnected from each other.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims and equivalents thereof.

What is claimed is:

1. A battery pack comprising:
    a core pack comprising a bare cell and a protection circuit module electrically coupled to the bare cell;
    a lower case receiving the core pack and having a receiving groove on a top surface of a sidewall of the lower case; and
    a cover plate comprising a base cover covering a front surface of the bare cell and side covers, a corresponding one of the side covers being inserted into the receiving groove,
    wherein each of the side covers comprises an extension portion perpendicularly extending from the base cover and a reinforcement portion that is substantially parallel to the extension portion and is coupled to the extension portion by a bent portion, and
    a continuous surface of the reinforcement portion and the extending portion face each other.

2. The battery pack of claim 1, wherein the side covers of the cover plate are connected to one another.

3. The battery pack of claim 1, wherein the side covers are bent inward with respect to the cover plate.

4. The battery pack of claim 1, wherein the lower case comprises:
    a reinforcement plate comprising a base plate and side plates perpendicularly extending from edges of the base plate; and
    a resin portion formed to cover the reinforcement plate.

5. The battery pack of claim 4, wherein the side plates of the reinforcement plate are connected to one another.

6. The battery pack of claim 4, wherein at least one resin hole is through each of the side plates in a thickness direction.

7. The battery pack of claim 4, wherein the side plates are bent at least once.

8. The battery pack of claim 4, wherein the resin portion is formed to envelop the side plates.

9. The battery pack of claim 4, wherein the resin portion has an outer wall outside the lower case and an inner wall inside the lower case, and the receiving groove is on a top surface of the inner wall.

10. The battery pack of claim 9, wherein the inner wall is lower than the outer wall.

11. The battery pack of claim 10, wherein a thickness of the base cover is substantially equal to a height difference between the inner wall and the outer wall such that a thickness of the battery pack is substantially equal to the height of the outer wall.

12. The battery pack of claim 1, wherein the lower case comprises:
    a reinforcement plate comprising a base plate and side plates perpendicularly extending from edges of the base plate; and
    a resin portion covering the side plates only.

* * * * *

UNITED STATES PATENT AND TRADEMARK OFFICE
CERTIFICATE OF CORRECTION

PATENT NO. : 8,835,042 B2  
APPLICATION NO. : 13/163455  
DATED : September 16, 2014  
INVENTOR(S) : Sangdo Heo Page 1 of 1

It is certified that error appears in the above-identified patent and that said Letters Patent is hereby corrected as shown below:

In the Claims

Col. 10, line 7, Claim 1    Delete "extending portion",  
Insert --extension portion--

Signed and Sealed this  
Second Day of August, 2016

Michelle K. Lee  
*Director of the United States Patent and Trademark Office*